United States Patent [19]

Ismail Roshdy et al.

[11] 3,853,935

[45] Dec. 10, 1974

[54] ARALKYL SILANES SUBSTITUTED IN THE NUCLEUS

[76] Inventors: Ismail Roshdy, Schulstr. 21, 5206 Neunkirchen; Paul Janssen, Am Zaarshauschen 17, 506 Bensberg-Refrath, both of Germany

[22] Filed: Mar. 30, 1973

[21] Appl. No.: 346,528

[30] Foreign Application Priority Data
Mar. 30, 1972 Germany.......................... 2215629

[52] U.S. Cl. ...... 260/448.8 R, 117/124 F, 117/127, 117/135.1, 260/448.2 B, 260/448.2 N
[51] Int. Cl. ............................ C07f 7/10, C07f 7/18
[58] Field of Search............... 260/448.8 R, 448.2 B, 260/448.2 N

[56] References Cited
UNITED STATES PATENTS
3,513,184  5/1970  Brison et al.................. 260/448.8 R

*Primary Examiner*—Patrick P. Garvin
*Assistant Examiner*—Paul F. Shaver
*Attorney, Agent, or Firm*—Burgess, Dinklage & Sprung

[57] ABSTRACT

Novel organosilicon compounds of the general formula

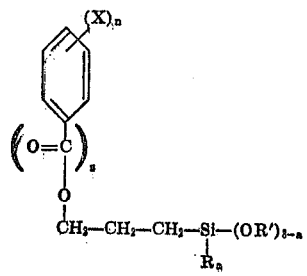

wherein $x$ is $NO_2$ or $NH_2$, $n$ is 1 or 2, $z$ is 0 or 1, $a$ is 0, 1 or 2, and when R is halogen, $a$ equals 1, 2 or 3 R is an identical or different alkyl, aryl or aralkyl radical or halogen and R' is alkyl, oxalkyl or aryl; a process for preparing such new organosilicon compounds by contacting an organosilicon compound containing an Si-H bond in the molecule in the presence of a platinum-containing catalyst with an aromatic allyl ester or aromatic allyl ether, whose aromatic radical is substituted by one or two nitro or amino groups.

18 Claims, No Drawings

3,853,935

1

ARALKYL SILANES SUBSTITUTED IN THE NUCLEUS

BACKGROUND OF THE INVENTION

1. Field of the Invention

This invention is directed to new organosilicon compounds and the method of their preparation. More particularly, this invention is directed to novel organosilicon compounds which are aromatic esters or ethers wherein the aromatic function contains an amino or nitro group on the ring.

This invention is also directed to the preparation of the same by reaction an organisilicon compound containing an Si-H group, especially an alkoxysilane or a halosilane.

2. Discussion of the Prior Art

It is known that hydrogen silanes can be reacted in the presence of platinum compounds or platinum with aliphatic or cycloaliphatic carbon compounds containing olefinic double bonds. Such processes are described, for example, in German patents or "Auslegeschriften" 1,169,936, 1,161,270 and 1,156,073.

German Pat. No. 1,069,148 names styrene, divinylbenzene or allylbenzene as examples of suitable unsaturated aliphatic or alicyclic compounds. The compounds made by this process do not have a benzoic acid propyl or phenoxy propyl radical substituted at the aromatic nucleus as an organofunctional radical.

SUMMARY OF THE INVENTION

Broadly, this invention contemplates organosilane compounds of the formula

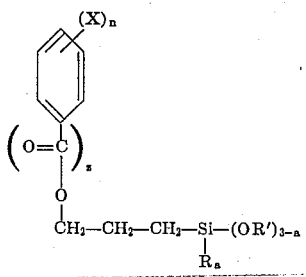

wherein $x$ is $NO_2$ or $NH_2$, $n$ is 1 or 2; $z$ is 1 or 0; $a$ is 0, 1 or 2 but if R = halogen $a$ is 1, 2 or 3, R is identical or different, alkyl, aralkyl, aryl or halogen and R' is alkyl, oxalkyl or aryl.

This invention further contemplates a process for preparing such novel organosilicon compounds which comprises contacting an aromatic allyl ester or aromatic allyl ether whose aromatic radical is substituted by 1 or 2 amino or nitro groups in the presence of a platinum-containing catalyst with an organosilicon compound containing an Si-H bonded in the molecule. Especially suitable organosilicon compounds containing an Si-H bond in the molecule include those having the following formula

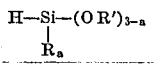

$a$ = 0, 1 or 2 except when R = halogen and in that event $a$ = 1, 2 or 3. R, as indicated above, is independently alkyl, aryl or aralkyl. R' is alkyl, oxalkyl or aryl.

2

With respect to the Si-H containing compounds reacted, when R is alkyl it generally contains between $C_1$ and $C_6$ carbon atoms. If R is aryl, it is generally phenyl, naphthyl, biphenyl or anthracyl, especially phenyl. Where R is aralkyl the aryl group is preferably phenyl, the alkyl group contains between one and six carbon atoms. If R is halogen, the halogen can be the same or different and can be fluorine, chlorine, bromine or idoine.

R' is suitably an alkyl group of $C_1$ $CH_{C6}$ or an oxalkyl wherein the alkyl is $C_1$ to $C_6$ carbon atoms. Where R' is an aryl radical it is generally one of the above specifically named aryl radicals, especially phenyl. Examples for oxalkyl radicals are: $-CH_2-CH_2-O-CH_3$, 2$-CH_2-O-CH_2-CH_3$, $-(CH_2)_4-O-CH_2-CH_3$ or $CH_2-CH_2-O-CH_2-CH_2-O-CH_3$.

In accordance with the process the organosilicon compound is contacted with the aromatic allyl ether or ester at a temperature between 10° and 150°C, preferably between 20° and 120°C for between 60 and 600 minutes, preferaboy between 90 and 500 minutes. While the reaction can be conducted at elevated and decreased pressure, it is conventionally carried out at atmospheric pressure or under autogenous pressure. However, broadly, the pressure can range from between 0.5 atm and 5 atm.

It is also convenient to react the aromatic allyl or aromatic allyl ester with the silane in a solvent of each reactant which is inert to the reactants and to the products. Suitable solvents include benzene, toluene, xylene and tetrahydrofuran.

Generally speaking, the silane and the aromatic allyl ester or ether are reacted in stoichiometric amounts, although a stoichiometric excess of silane up to say 10 molar percent is desirable, in some cases.

The reaction conveniently is carried out using a noble metal catalyst, especially a platinum catalyst, which is present in an amount between 0.01 and 0.2 percent by weight, based upon the weight of the reaction mixture, exclusive of solvent. The preparation of the novel organosilicon compound proceeds especially well when the noble metal containing catalyst is platinum or palladium. Specifically contemplated catalysts include hexachloroplatinic acid - hexahydrate, metallic platinum in different forms as disclosed in U.S. Pat. No. 2,970,150, platinic chloride and derivatives of platicinic chloride, as disclosed in U.S. Pat. No. 2,823,218, complex salts of platinic chloride were, for example, acetyl acetone and mesityloxide. However, it should be understood that other platinum or noble metal compounds which contain platinum or palladium in an anionic or cationic form are also suitable.

It has been found that trihalosilanes, especially trichlorosilane, is especially reactive with the aromatic allyl ester or ether. Hence, an especially desirable method of preparing trialkoxy substituted derivatives of the above novel organosilanes involves a process in which a process in a first step contacting the aromatic aryl ester or ether with a halosilane having the formula

wherein R is independently a halogen for a period of time between 120 and 450 minutes, preferably in an inert solvent of the ester or ether and a solvent; thereafter contacting the nitro or amino aromatic (trihalosilylpropyl) ester or ether with an alcohol, especially a $C_1$ to $C_4$ alcohol in the presence of a solvent under conditions affecting evolution of hydrogen halide whereby to obtain the corresponding trialkoxysilylpropyl ester or ether.

Suitably the first step is carried out at a temperature of between 20° and 110°C and at a pressure between 760 and 1,500 mm/Hg for between 120 and 450 minutes. Stoichiometric amounts of silane are employed or silane is present in a slight excess. The second step is carried out at a temperature of between 50° and 120°C and hydrogen halide is caused to be evolved at these temperatures. The alcohol is generally a monovalent alcohol such as methanol, ethanol, n-propanol, isopropanol, n-butanol, sec-butanol or isobutanol.

DESCRIPTION OF SPECIFIC EMBODIMENTS

For the process of the invention, trichlorosilane or a trialkoxysilane is preferred as the Si-H compound. Trialkoxysilanes whose alkyl radicals have one to four carbon atoms each, such as trimethoxysilane, triethoxysilane, tripropoxysilane, tributoxysilane and those oxalkylated derivatives whose oxalkyl radical has one to four carbon atoms are preferred as reaction components. It has also been found that trichlorosilane and the above-named trialkoxysilanes are especially well suited for the process; the reaction time is surprisingly short and the yields are high when these components are used.

Additional examples of SiH compounds which can be reacted according to the invention are dimethoxychlorosilane, methyldiethoxysilane, ethyldiethoxysilane, methoxydichlorosilane, methyldichlorosilane, tris-($\beta$-methoxyethoxy)-silane and triphenoxysilane.

m-Nitrobenzoic acid allyl ester or p-nitrobenzoic acid allyl ester is used advantageously as the aromatic allyl ester. Examples of additional aromatic allyl esters which may be used as a reaction component in accordance with the invention are: o-nitrobenzoic acid allyl ester, 3,5-dinitrobenzoic acid allyl ester, and o- or p- or m-aminobenzoic acid allyl ester and 3,5-diamino- or 2,4-diamino-or 2,6-diaminobenzoic acid allyl ester.

The following are examples of allyl ethers which can be reacted in accordance with the invention: o-nitrophenylallyl ether, m-nitrophenylallyl ether, p-nitrophenylallyl ether, 3,5-dinitrophenylallyl ether, 2,4-dinitrophenylallyl ether, 2,6-dinitrophenylallyl ether and the corresponding mono-or diaminophenylallyl ethers. The allyl esters and ethers are prepared by known methods, e.g., by the reaction of the corresponding phenol with allyl-halide or of the corresponding benzoic acid with allyl alcohol.

The reaction of the mononitro- or dinitrobenzoic acid allyl esters of the corresponding ethers or of a corresponding mono- or diaminobenzoic acid allyl ester or of the corresponding ether, with an SiH compound is performed in a prior-art manner in the presence of platinum or of a platinum compound, such as hexachloroplatinic acid, as the catalyst, in the presence of solvents such as toluene if desired.

Ordinarily the reaction components are brought to the reaction in a solvent, in equimolar quantities at warm temperatures of, for example, about 28°C to 90°C. It has proven desirable, however, to use the SiH compound in a slight excess, say up to 10 molar percent excess.

The platinum compounds to be used may be either inorganic platinum compounds, such as hexachloroplatinic acid or platinum-(IV) complex compounds.

In the preparation of, for example, m- or p-nitrobenzoic acid-(trialkoxysilylpropyl)-ester, the m- or p-nitrobenzoic acid allyl ester may be reacted directly with trialkoxysilane in the presence of platinum or a platinum compound as catalyst. However, it has proven to be especially advantageous first to react the m- or p-nitrobenzoic acid allyl ester with trichlorosilane to form the m-or p-nitrobenzoic acid-(trichlorosilylpropyl) ester in a solvent in the presence of platinum or a platinum compound and then to bring the m- or p-nitrobenzoic acid-(trichlorosilypropyl) ester into reaction with the desired alcohol, e.g., $C_1$ to $C_4$ alcohol, in the presence of a solvent, such as toluene, and finally to drive off the hydrogen chloride that develops, for it has been found that the reaction of the trichlorosilane with the m- or p-nitrobenzoic acid ester takes place with high yields in a surprisingly short period of time.

In like manner, the m- or p-aminobenzoic acid-(trimethoxysilylpropyl) ester can be prepared by reacting the m- or p-aminobenzoic acid allyl ester with trialkoxysilane, or by hidrogenating the m- or p-nitrobenzoic acid-(trialkoxysilylpropyl) ester with hydrogen at elevated pressure in a water-free medium in the presence of palladium, in a prior-art manner.

Novel organosilicon compounds, whether in an ether or ester form, can be used as agents for the protection of inorganic oxidic surfaces. They can be employed to bond organic surfaces to certain metallic or inorganic substances. Generally speaking, they can be employed to bond materials such as thermoplastic and thermosetting polymers, including, in particular, polyaddition products such as epoxy resins, urethane resins, polyester resins, polyamides, polyimides, polyacetals, in the acrylic family, polyolefins, polycondensation products, to the metallic or inorganic substances. They are especially useful in connection with phenol aldehyde resins. They can be used to facilitate bonding of glass fibers and other materials having an inorganic oxidic surface, such as glass, quartz, diatomaceous earth, sand, clay, asbestos, mica, iron oxide, calcium carbonate, calcium sulfate and the like. They can be used in the preparation of sand cores by initially forming a cold or heat setting resin of phenol, formaldehyde and furfuryl alcohol and sodium carbonate to which is added sand. Thereafter an acid hardener such as $H_3PO_4$ is added, together with the silane in an amount equal to 0.2 weight percent based upon the weight of the resin. The same can be formed into the desirable shape where the resin cures to the shape desired.

In order to more fully illustrate the nature of the invention and the manner of practicing the same, the following examples are presented.

EXAMPLES

1. Preparation of m-nitrobenzoic acid allyl ester

In a 2-liter round flask provided with water separator and stirrer, 167 g (1 mole) of m-nitrobenzoic acid, 75.4 g of allyl alcohol (1.3 mole), 400 ml of xylene and 3.3 g of p-toluenesulfonic acid are boiled for about 10 hours; 25 ml of a mixture of alcohol and water separate. The cooled solution is shaken with water to neutrality, then the xylene is removed by vacuum distillation. The crude ester is fractionally distilled.

$Kp_{15}$ 174°C; $n_D^{20}$ 1,5430; yield: 95 percent of the theory.

2. Preparation of m-nitrobenzoic acid-(trichlorosilylpropyl) ester

Batch mixture: 207 g of m-nitrobenzoic acid allyl ester (1 mole)
111 ml $HSiCl_3$ (1.1 mole)
400 ml of toluene
100 mg of hexachloroplatinic acid.

In a 2-liter three-neck flask provided with condenser (−20°C), stirrer and dropping funnel, 207 g of m-nitrobenzoic acid allyl ester and 100 mg of hexachloroplatinic acid are dissolved in 400 ml of toluene. 149.05 g of trichlorosilane is added drop by drop over a period of 30 minutes, with stirring, at 30°C. Then the temperature is increased to 60°C for 2 hours and then to 90°C for another 2 hours.

The excess $HSiCl_3$ and the toluene are then removed by distillation. The crude ester is fractionally distilled.

$Kp_{0.8}$ 206°–208°C; $n_D^{20}$ 1.5347; yield: 90 percent.

|  | C | H | N | Si | Cl |
|---|---|---|---|---|---|
| Theory | 35.0 | 2.92 | 4.08 | 8.16 | 31.05 |
| Found | 36.52 | 2.82 | 3.84 | 7.70 | 29.6 |

3. Preparation of m-nitrobenzoic acid-(trimethoxysilylpropyl) ester 342.5 g (1 mole) of m-nitrobenzoic acid-(trichlorosilylpropyl) ester dissolved in 400 ml of toluene is placed in a 2-liter three-necked flask provided with condenser, stirrer and $N_2$ introduction tube. Over a period of 30 minutes 115.2 g (3.6 moles) of methanol are added drop by drop at room temperature, with stirring. The HCl gas that forms is flushed from the reaction medium by means of $N_2$ and captured in NaOH and titrated.

| Time | Temperature | % HCl of the theory |
|---|---|---|
| 45 min | 20°C | 40 |
| 50 min | 50°C | 50 |
| 65 min | 70°C | 60 |
| 80 min | 95°C | 70 |
| 130 min | 95°C | 80 |

$NH_3$ is then passed through the reaction medium until neutrality is achieved. After filtration and removal of the solvent by distillation, the crude ester is fractionally distilled.

$Kp_{0.8}$ 178°C; $n_D^{20}$ 1.4976; yield: 85 percent

|  | C | H | N | Si |
|---|---|---|---|---|
| Theory | 47.4 | 5.77 | 4.26 | 8.51 |
| Found | 46.94 | 5.78 | 4.02 | 9.00 |

4. Preparation of m-aminobenzoic acid-(trimethoxysilylpropyl) ester

In a high-pressure autoclave (capacity 1 liter) 50 g of m-nitrobenzoic acid-(trimethoxysilylpropyl) ester and 5 g of palladium on active charcoal (5 percent) are suspended in 500 ml of water-free methanol. The reaction is performed at room temperature under a hydrogen pressure of 80 atmospheres gauge. Within 10 minutes the theoretical amount of hydrogen is absorbed. For completion, the hydrogenation is continued for another 3 hours under the same conditions. The methanol was removed by evaporation at about 40°C. The following values were found by analysis:

$n_D^{20}$ = 1.5155

|  | C | H | N | Si |
|---|---|---|---|---|
| Theory | 51.2 | 7.02 | 4.68 | 9.36 |
| Found | 51.99 | 6.78 | 4.53 | 9.51 |

5. o- and p-nitrobenzoic acid allyl ester

Corresponding to Example 1) also o- and p-nitrobenzoic acid allyl ester were produced from o- resp. p-nitrobenzoic acid and allyl alcohol. The boiling points and the analytic results of both these compounds are given in the following:

|  | Boiling Point | Melting Point | C calc. | C res. | H calc. | H res. | N calc. | N res. |
|---|---|---|---|---|---|---|---|---|
| o-$NO_2$-Comp. | 173–176°C/12 mm | — | 57,97 | 58,40 | 4,38 | 4,63 | 6,76 | 6,35 |
| p-$NO_2$-Comp. | 171°C/14 mm | 28°C | 57,97 | 58,02 | 4,38 | 4,30 | 6,76 | 6,75 |

6. o- and p-nitrobenzoic acid-(trichlorosilylpropyl)-ester o-or p-nitrobenzoic acid allyl ester (207g) are, as exactly shown in example 2), reacted together with 111ml $HSiCl_3$ in 400 ml toluol after addition of 100 mg $H_2PtCl_6 \cdot 6H_2O$. Each was heated for 2 hours at a temperature of 60° and 90°C, and afterwards the reaction mixture was fractionally distilled.

7. p-nitrophenylallyl ether 48,4 g p-nitrophenol (0,4 mol) and 48,5 g allyl bromide (0,46 mol) were together with 56 g pulverited and dried $K_2CO_3$ (0,4 mol) and 100 ml dry acetone for 8 hours heated until boiling. After having cooled down the mixture was diluted with water, and the phenylallyl ether was shaken out with ether. The etheral solution was washed with 10 per cent NaOH and $H_2O$, dried and then distilled in vacuo.

| Boiling Point | 122–123°C/0,9 mm | | | |
|---|---|---|---|---|
| Yield | 61,0 g (85 % of theory) | | | |
| $n_D^{20}$ | 1,5791 | | | |
| $C_9H_9NO_3$ (179,177) | calculated | C 60,33 | H 5,06 | N 7,82 |
| | result | C 60,04 | H 5,04 | N 7,92 |

8. p-nitrophenyl- (trichlorosilylpropyl) -ether 179 g p-nitrophenylallyl ether (1 mol) were dissolved in 400 ml dry toluol, 100 mg $H_2PtCl_6 \cdot 6H_2O$ were added, and at a temperature of 30°C 111 ml $HSiCl_3$ (1.1 mol) were added drop by drop. The reaction mixture was fractionally distilled.

| Yield | 245 g (78 % of theory) | | | | | | | | |
|---|---|---|---|---|---|---|---|---|---|
| Boiling Point | 190–195°C/0,8 mm | | | | | | | | |
| $C_9H_{10}Cl_3NO_3Si$ | calculated | C | 108,10 | H | 10,08 | N | 14,01 | Cl | 106,36 |
| | | | | | | | | Si | 28,0 |
| (314,65) | result | C | | H | | N | | Cl | |
| | | | | | | | | Si | |

9. m-nitrophenyl -(trichlorosilylpropyl)- ether

The m-nitrophenylallyl ether was produced corresponding to the bibliography of H. L. Goering and R. R. Jakobson, J. Amer. chem. Soc. 80 (1958) 3278.

The ensilage with trichlorosilane was as in Example 8) thus carried out that within 7 hours at a temperature of 100°C 179 g m-nitrophenylallyl ether was reacted with 111 ml $HSiCl_3$ in dry toluol after addition of 100 mg $H_2PtCl_6 \cdot 6H_2O$. By means of fractional distillation the ensilage product was isolated at a temperature of 180°–183°C/0,5 mm.

10. p-aminophenylallyl ether p-aminophenylallyl ether was produced corresponding to the bibliographic prescription of W. N. White a.o., J. Amer. chem. Soc. 80 (1958) 3271.

This allyl ether can corresponding to Examples 2 or 8 with trialkoxysilanes be transposed to p-aminophenyl -(trialkoxysilylpropyl)- ether. Last mentioned compound can as well be synthetised by means of a reduction of the corresponding $NO_2$-compound.

What is claimed is:

1. A novel organosilicon compound of the formula

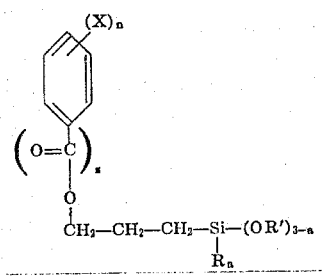

wherein X is $NO_2$ or $NH_2$
n is 1 or 2
z is 0 or 1
a is 0, 1 or 2 or 1, 2 or 3 when R is halogen
R is independently selected from the group consisting of alkyl, aryl, aralkyl and halogen and
R' is independently selected from the group consisting of alkyl, alkyl ether radical, polyalkyl ether radical and aryl.

2. A compound according to claim 1, wherein R is selected from the group consisting of $C_1$ to $C_6$, phenyl and aralkyl, wherein the aryl portion is phenyl and the alkyl portion is $C_1$ to $C_6$ and R' is selected from the group consisting of $C_1$ to $C_6$ alkyl, $C_1$ to $C_6$ alkyl, $C_1$ to $C_6$ alkyl ether radical, polyalkyl ether radical and phenyl.

3. m-nitrobenzoic acid-(trichlorosilylpropyl) ester, according to claim 1.

4. m-nitrobenzoic acid-(trimethoxysilylpropyl) ester according to claim 1.

5. m-aminobenzoic acid-(trimethyoxysilylpropyl) ester according to claim 1.

6. A novel organosilicon compound of the formula

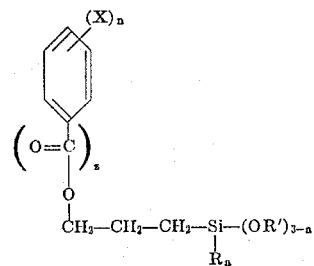

wherein X is $NO_2$
n is 1 or 2
z is 0 or 1
a is 0, 1 or 2 or 1, 2 or 3 when R is halogen
R is independently selected from the group consisting of alkyl, aryl, aralkyl and halogen and
R' is independently selected from the group consisting of alkyl, alkyl ether radical, polyalkyl ether radical and aryl.

7. A novel organosilicon compound as claimed in claim 1 wherein z is 0.

8. A process for preparing a novel organosilicon compound of claim 1 which comprises contacting an organo-silicon compound containing an Si-H bond in the molecule in the presence of a noble metal containing catalyst with an aromatic allyl ester or an aromatic allyl ether whose aromatic radical is substituted by one or two amino or nitro groups for a period of time between 120 and 450 minutes at a temperature between 20° and 110°C at a pressure between 760 and 1,500 mmHg and thereafter heating the resultant nitro or amino aromatic (trihalosilylpropyl) ester or ether at a temperature between 50° and 120°C with an alcohol.

9. A process according to claim 8 wherein the aromatic portion of the allyl-containing compound is phenyl and the compound containing the Si-H bond has the formula

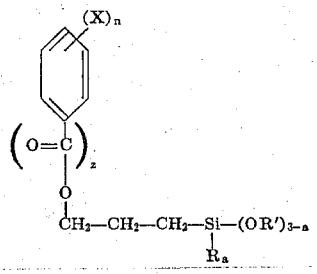

wherein R is independently selected from the group consisting of alkyl, aralkyl, aryl and halogen, R' is independently selected from the group consisting of alkyl, alkyl ether radical, polyalkyl ether radical and aryl, $a$ is 0, 1 or 2 but when R = halogen $a$ is 1, 2 or 3.

10. A process according to claim 9 wherein R is independently selected from the group consisting of $C_1$ to $C_6$ alkyl, phenyl, aralkyl where alkyl contains between one and six carbon atoms and the aryl portion is phenyl and halogen and R' is selected from the group consisting of $C_1$ to $C_6$ alkyl, $C_1$ to $C_6$ alkyl ether radical, polyalkyl ether radical and phenyl, and the reaction is carried out in the presence of platinum or platinum-containing compound as catalyst.

11. Process according to claim 10 wherein trichlorosilane is used as the Si-H-containing organosilicon compound.

12. A process according to claim 10 wherein the Si-H containing compound is a trialkoxysilane.

13. A process according to claim 12 wherein the alkyl radical of the trialkoxysilane contains between 1 and 4 carbon atoms each.

14. A process according to claim 9 wherein an allyl ester is reacted with the compound containing the Si-H group.

15. A process according to claim 14 wherein the allyl ester is m-nitrobenzoic acid allyl ester.

16. A process according to claim 14 wherein the allyl ester is p-nitrobenzoic acid allyl ester.

17. A process according to claim 9 wherein the catalyst is hexachloroplatinic acid.

18. A process according to claim 9 wherein the compound containing Si-H group is selected from the group consisting of trimethoxysilane, triethoxysilane, tripropoxysilane, tributoxysilane and oxyalkylated silane whose oxyalkyl radical has one to four carbon atoms, trichlorosilane, dimethoxychlorosilane, methyldiethoxysilane, ethyl diethoxy silane, methoxydichlorosilane, methyldichlorosilane, tris-($\beta$-methoxyethoxy) silane and triphenoxysilane and the allyl ester or ether is selected from the group consisting of o-nitrobenzoic acid allyl ester, 3,5-dinitro benzoic acid allyl ester, o-aminobenzoic acid allyl ester, p-aminobenzoic acid allyl ester, m-aminobenzoic acid allyl ester, 3,5-diaminobenzoic acid allyl ester, 2-4-diaminobenzoic acid allyl ester, 2-6-diaminobenzoic acid allyl ester, o-nitrophenyl allyl ether, m-nitrophenyl allyl ether, p-nitrophenyl allyl ether, 3-5-dinitrophenyl allyl ether, 2-4-dinitrophenyl allyl ether, 2-6-dinitrophenyl allyl ether, o-aminophenyl allyl ether, m-aminophenyl allyl ether, p-aminophenyl allyl ether, 3-5-diaminophenyl allyl ether, 2-4-diaminophenyl allyl ether and 2-6-diaminophenyl allyl ether.

* * * * *